June 27, 1950 G. A. FORSBERG 2,512,892
HEATING APPARATUS FOR HOT AIR OR STEAM BATHS
Filed Aug. 4, 1947
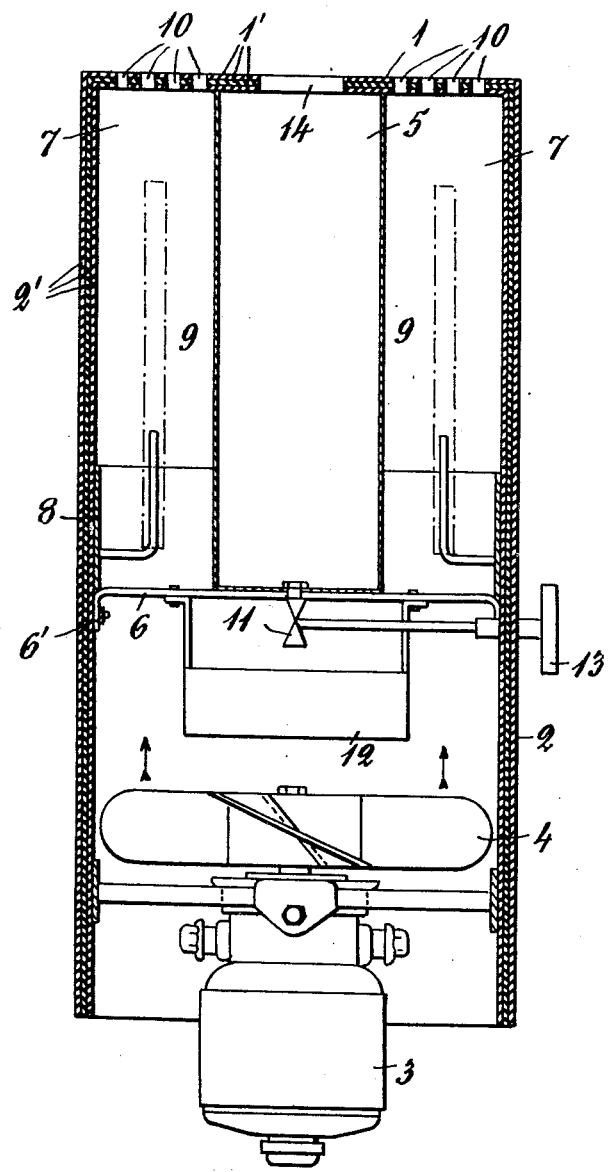
INVENTOR
GÖTE ANSGAR FORSBERG
ATTORNEY Patented June 27, 1950

2,512,892

UNITED STATES PATENT OFFICE 2,512,892

HEATING APPARATUS FOR HOT-AIR OR STEAM BATHS

Göte Ansgar Forsberg, Enkoping, Sweden

Application August 4, 1947, Serial No. 765,976
In Sweden October 11, 1944

Section 1, Public Law 690, August 8, 1946
Patent expires October 11, 1964

3 Claims. (Cl. 219—39)

The invention relates to heating apparatus for producing heated air as used in connection with hot air baths of the type in which heated air is discharged into a bath room by means of a fan (known in Sweden "Bastu-Apparatus").

One object of the invention is to provide a heating apparatus of the general type, above referred to, by means of which a current of heated, humidified air can be produced in a convenient and efficient manner.

Another object of the invention is a heating apparatus of the general type, above referred to, which consists of a compact and sturdy unit which contains all parts required to produce a current of heated, humidified air.

According to a now preferred embodiment of the invention, a receptacle containing a supply of water and a fan are provided, one mounted above the other. The fan can be positioned above or below the receptacle. The latter is either surrounded by one or more air ducts or the air ducts are surrounded by the receptacle. In either case, an air current is propelled through the ducts by means of the fan. The receptacle is provided with a valve by means of which water may be discharged into the air current for the purpose of humidifying the air before reaching the bath room. To distribute water tapped from the receptacle in the air current, water distributing means of suitable design are preferably provided. The air current is heated by heating means, preferably directly by electric heaters, whereby the water in the receptacle is indirectly heated. The receptacle, the air ducts and the fan are preferably mounted in a common housing heat insulated against loss of heat toward the outside.

According to another embodiment of the invention, the container is partly filled with a solid, heat storing material, such as granulated stones. These stones are heated by any suitable means, for instance indirectly by the heated air current. As a result, water in the container or poured over the heated stones will be vaporized and the steam will mix with the heated air, thereby humidifying the same. In such arrangement, the valve for discharging water from the receptacle may be omitted.

Other and further objects, features and advantages of the invention will appear hereinafter and be pointed out in the appended claims forming part of the application.

In the accompanying drawing, the single figure shows a now preferred embodiment of the invention by way of illustration and not by way of limitation.

Referring now to the drawing in detail, the heating apparatus, as shown, comprises a tubular-shaped casing 2 open at the bottom and closed at its upper end by a perforated cover 1. The lower portion of the casing houses an electric motor 3 directly rotating a fan blade 4. Cover 1 and housing 2 are made of any suitable material, preferably of insulating material to insulate the interior of the housing against the outer temperature. In the embodiment shown, the walls of the cover and the housing are composed of three plates 1' and 2' respectively made of fibrous material.

The upper part of casing 1 contains a receptacle 5 arranged to receive a supply of water. Receptacle 5 is supported by a bracket 6 which in turn is fastened to the walls of housing 2 by any suitable means such as nuts and bolts 6'. As will be apparent, the walls of receptacle 5 and the adjacent walls of housing 2 form an annular air duct 7. The blades of fan 4 are so adjusted that the fan will suck an air current through the open end of housing 2 and force the air current through duct 7 along the walls of receptacle 5. There are provided in air duct 7 suitable means for heating the air current such as conventional electric heater coils 9 which are fastened by means of a ring 8 to the housing walls. The heated air heats the water in receptacle 5 while flowing along the receptacle walls and is then discharged through perforations 10 in cover 1 into the bath room proper (not shown). In certain instances, it is desired to humidify the air current. For this purpose, water can be tapped from receptacle 5 by means of a conventional valve 11. The water discharged through valve 11 drops on a distributor 12 also supported by bracket 6. The distributor serves to facilitate the injection of the tapped water into the air current. Adjustment means such as a handwheel 13 serve to adjust the amount of water discharged through valve 11 and hence the humidity percentage of the air current.

According to a modification of the invention, receptacle 5 is partly filled with solid heat storing material such as gravel or granulated stones. This material can be heated by the heated air current as previously described or directly when a bath is prepared. If water is poured over the hot stones or filled into receptacle 5, it will be vaporized and the ensuing steam will leave receptacle 5 through an opening 14 in cover 1 and mix with the heated air discharged through perforations 10.

While the invention has been described in detail with respect to a certain now preferred example and embodiment of the invention it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. In a heating apparatus for hot air baths of the type in which a current of heated air is discharged into a bath room, the combination of a fan for producing a directed air current, a receptacle closed at the bottom arranged to receive a supply of water, heat storing solid material placed in said receptacle and arranged to be brought in heat conducting contact with said water supply, an open tubular heat insulated housing, in which said fan and said receptacle are mounted in alignment, the fan below the receptacle, the inner housing wall and the outer receptacle wall constituting an air duct for guiding the air current between the outer wall of said receptacle and the inner wall of the housing, heating means mounted in said air duct for heating the air directly and the heat storing material indirectly and adjustable valve means inserted in the bottom of the receptacle for discharging water from said water supply into the air current.

2. In a heating apparatus for hot air baths of the type in which a current of heated air is discharged into a bath room, the combination of a tubular housing open at both ends, a receptacle disposed in the upper part of said housing co-axially therewith and providing an annular air-duct between housing and receptacle, said receptacle being filled with a supply of solid heat storing material, a motor driven blower mounted in the lower part of the housing to direct an air current upwardly through the air duct toward the upper part of the housing, and electrical heating means disposed within the air duct to heat the air current directly and the solid heat storing material indirectly.

3. In a heating apparatus for hot air baths of the type in which a current of heated air is discharged into a bath room, the combination of a cylindrical housing open at both ends, a cylindrical receptacle disposed in the upper part of said housing co-axially therewith and providing an annular air duct between housing and receptacle, said receptacle being filled with a supply of solid heat storing material, a motor driven blower mounted in the lower part of the housing to direct an air current upwardly through the air duct toward the upper end of the housing, electrical heater coils disposed within the air duct to heat the air current directly and the solid heat storing material indirectly.

GÖTE ANSGAR FORSBERG.

REFERENCES CITED

The following references are of record in the file of this patent:

UNITED STATES PATENTS

| Number | Name | Date |
|---|---|---|
| 1,013,368 | Blomfeldt | Jan. 2, 1912 |
| 1,528,495 | Lennig | Mar. 3, 1925 |
| 1,706,846 | Fisher | Mar. 26, 1929 |
| 1,900,956 | Somersall | Mar. 14, 1933 |